United States Patent [19]

Fujita

[11] E Re. 30,258

[45] Reissued Apr. 22, 1980

[54] DATA RECORDING CAMERA

[75] Inventor: Susumu Fujita, Kobe, Japan

[73] Assignee: Fuji Photo Film Co., Ltd., Minami-ashigara, Japan

[21] Appl. No.: 896,074

[22] Filed: Apr. 13, 1978

Related U.S. Patent Documents

Reissue of:

[64] Patent No.: 4,001,850
Issued: Jan. 4, 1977
Appl. No.: 624,020
Filed: Oct. 20, 1975

[30] Foreign Application Priority Data

Oct. 25, 1974 [JP] Japan ..... 49-123813

[51] Int. Cl.[2] ..... G03B 13/02; G03B 17/24

[52] U.S. Cl. ..... 354/106; 354/219

[58] Field of Search ..... 354/105–108, 354/53, 219

[56] References Cited

U.S. PATENT DOCUMENTS

| | | | |
|---|---|---|---|
| 3,185,054 | 5/1965 | Niggeloh | 354/108 |
| 3,703,129 | 11/1972 | Goshima et al. | 354/106 |
| 3,733,985 | 5/1973 | Gordon | 354/107 |
| 3,765,754 | 10/1973 | Winkler | 354/105 X |
| 3,812,508 | 5/1974 | Matsuda et al. | 354/106 |

FOREIGN PATENT DOCUMENTS

| | | | |
|---|---|---|---|
| 598518 | 6/1934 | Fed. Rep. of Germany | 354/219 |
| 1300826 | 8/1969 | Fed. Rep. of Germany | 354/219 |

*Primary Examiner*—Donald A. Griffin
*Attorney, Agent, or Firm*—Sughrue, Rothwell, Mion, Zinn and Macpeak

[57] ABSTRACT

Data recording camera in which content of an externally adjustable means for specification of data to accompany a photograph of an object is viewable in a viewfinder means of the camera, whereby a photographer while carying out normal procedures for taking of a photograph may check that content of the data specification means and position of this content relative to a subsequently produced photograph of an object also viewable in the viewfinder means are correct. Reproduction of this data content together with a photographic image of the object is dependent on actuation of means provided on the exterior of the camera and actuable by a photographer, who may therefore effect production of photographs accompanied or unaccompanied by related data in one and the same camera.

3 Claims, 5 Drawing Figures

DATA RECORDING CAMERA

Matter enclosed in heavy brackets [ ] appears in the original patent but forms no part of this reissue specification; matter printed in italics indicates the additions made by reissue.

BACKGROUND OF THE INVENTION

FIELD OF THE INVENTION

The present invention relates to a photographic means. More particularly the invention relates to a data recording camera permitting selective recording of relevant data together with the photographic image of an object.

DESCRIPTION OF THE PRIOR ART

There are known various photographic means, referred to below as 'data recording camera', which permit a particular item, or items, of data, for example, the date, to be recorded together with the photographic image of an object, such camera means generally having provided therein data specification means, which may be adjusted externally by a photographer, and an image of whose content is projected onto a film material simultaneously with projection onto the film material of image-wise light reflected from an object, whereby there is formed on the film material an image of the object accompanied by an image of the content of the data specification means. Ideally the image of the data specification means content should appear in a border or edge portion of the film material. However, it is known that after continued handling and use of the camera the data specification means, or means associated therewith, may become slightly displaced from a correct setting relative to the film material in a position for exposure to image-wise light, with the result that when a photograph is taken, the data content image is superimposed on a portion of the image of a photographed object. In a conventional data recording camera it is not possible to verify the position of a data specification means relative to film material prior to taking a photograph, with the result that if such displacement of data specification means occurs several photographs which are spoiled by superimposition thereon of data content may be produced before the photographer is aware that the data specification means is incorrectly positioned. Also in conventional means, since to verify the content of the data specification means it is necessary to turn the camera to a position other than that employed for taking a photograph, verification of data content is rendered slightly difficult, or it may be easily forgotten to check the setting of the data specification means, resulting, in many cases, in photographs accompanied by incorrect data.

Another drawback of conventional data recording cameras is that selective recording or non-recording of data is not possible in one and the same camera. In other words, it is wished to have photographs accompanied by data in some cases and unaccompanied by data in other cases, a photographer must make use of two separate cameras.

It is accordingly a principal object of the present invention to provide an improved data recording camera.

It is a further object of the invention to provide a data recording camera permitting selective production of photographs which are accompanied or unaccompanied by data.

It is another object of the invention to provide a data recording camera permitting easy verification of the content of a data specification means in a camera and of the position of this content relative to an image of an object to be photographed.

SUMMARY OF THE INVENTION

In accomplishing these and other objects, there is provided according to the present invention a data recording camera wherein there is provided an externally adjustable specification means which may be moved to different settings by a photographer in order to specify different content, representative of the data for example, and whose content is viewable in a viewfinder together with the image of an object to be photographed, the image of such an object being normally viewable in the viewfinder, and the content of the data specification means being viewable only if an externally actuable lock switch for actuation of a light source associated with the data specification means has been moved to an on position. When the camera shutter is actuated a gate means provided between the viewfinder portion of the camera and the camera portion for positioning of film material and exposure thereof to image-wise light reflected from the object seen in the viewfinder is opened, and, presuming the abovementioned light source is currently actuated, the content of the data specification means is directed onto and recorded on the film material receiving the image of the object to be photographed.

As seen by the photographer looking into the viewfinder, the relative position of the content of the data specification means to the object to be photographed is the same as that of the photographic image of the data content to the photographic image of the object on the film material. Thus, a photographer may, in the normal process of taking a photograph, immediately verify the content of the data specification means and also check that the position thereof relative to the image of an object to be photographed is correct. Further, since recording of the content of the data specification means on film material loaded in the camera is dependent on actuation of the associated light source, the photographer may cause data to be recorded together with photographs, or not, as he or she wishes, the only action required being simple actuation of a switch. This the camera of the invention offers the advantages that content and position of data subsequently recorded on film material may be easily verified, and that such recording of data may be effected selectively in one and the same camera.

A better understanding of the present invention may be had from the following full description of one preferred embodiment thereof when read in reference to the attached drawings, in which like numerals refer to like parts, and FIG. 1 is a simplified cross-sectional view of a data recording camera according to the invention, FIG. 2 is an exploded view showing relative positions of principal elements of the camera of FIG. 1, FIG. 3 is a plane view showing the arrangement of a specification means employed in the camera of FIG. 1, FIG. 4 is a similar view of FIG. 3 showing another arrangement of the specification means, and FIG. 5 is a similar view to that of FIG. 2 showing another relationship between the elements in the camera of FIG. 1.

DESCRIPTION OF PREFERRED EMBODIMENTS

Figure 1:
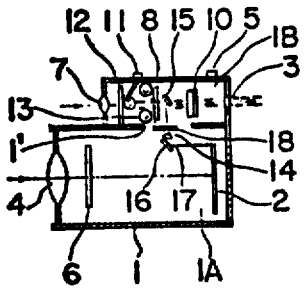

Referring first to FIG. 1, there is shown a camera having main wall portions 1 which define an exposure system compartment 1A and a viewfinder system compartment 1B. In the forward portion of the exposure system compartment 1A, that is facing the object being photographed, there is provided a lens system 4, through which, upon actuation of a shutter means 6 provided behind, or between component parts of, the lens system 4, image-wise light reflected from an external object to be photographed may be directed onto film material 2 which is positioned in a rear portion of the exposure system compartment 1A and is disposed generally at right-angles to the optical axis of the lens system 4. In an upper portion of the exposure system compartment 1A, and forward of the film material 2, there is provided a full-reflection mirror 16 and a lens 17, which together with a half-reflection mirror 15 mounted in the viewfinder system compartment 1B constitute a second optical system, described in fuller detail below, and are provided in line with and below a normally closed gate means 14 which is mounted in a main wall portion 1 which constitutes a partition wall 1' separating the exposure system compartment 1A and the viewfinder system compartment 1B.

Still in FIG. 1, in a forward portion of the viewfinder system compartment 1B, which in this embodiment of the invention is provided above the exposure system compartment 1A, there is provided a viewfinder lens 7 which has an optical axis parallel to but is out of vertical alignment with that of the lens system 4 and may direct light reflected from an object to be photographed into the view-finder system compartment 1B, through a half-reflection mirror 10 provided in the compartment 1B and to an eyelens 3 mounted in a rear wall portion of the viewfinder system compartment 1B, whereby a photographer looking into the eyelens 3 may view the object to be photographed.

Figure 2:
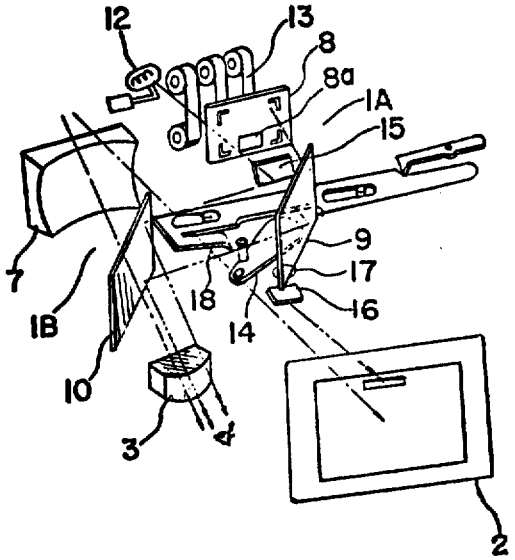

Still referring to FIG. 1 and also referring to FIG. 2, in a forward portion of the viewfinder system compartment 1B there is provided a data specification means 13 comprising reel-wound tape elements which may specify different items of data, for example, the data, and individually moveable to different settings by conventional means, for example, by a dial indicator, not shown, mounted on the exterior of the camera and actuable by a photographer, whereby the specification means 13 may specify different sets of data. Forward of the data specification means 3 with respect to the camera interior there is provided a light source 12, which when actuated may cause projection of imagewise light carrying the image of the content of the data specification means 3 through an opening 8a formed in a frame 8, which is provided to the rear of the data specification means 13, and prevents passage of other light emitted by the light source 12, i.e., the frame 8 permits passage only of light carrying the image of the content of specification means 13. Data content passed through the frame opening 8a when the light source 12 is actuated is directed to the abovementioned half-reflection mirror 15. The mirror 15 is positioned vertically above the abovementioned gate means 14 and lens 17, and may direct the image of the content the specification means 13 through the lens 17 and onto the full-reflection mirror 16, which is disposed to direct the image onto an upper portion of the film material 2. Image-wise light carrying the content of the data specification means 13 also passes through the half-reflection mirror 15, impinges on a full-reflection mirror 9, is directed thereby onto the abovementioned half-reflection mirror 10, and is directed by the mirror 10 to the eyelens 3. Projection of the image of the content specified by the means 13 onto the film material 2 is dependent on actuation of the light source 12 and on opening of the abovementioned gate means 14, and viewal of the content of the data specification means 13 via the eyelens 3 is dependent only on actuation of the light source 12. Also, when the light source 12 is actuated, as seen through the eyelens 3 the object to be photographed and the content of the data specification means 13 are in the positional relationship in which they will appear on the film material 2 subsequent to actuation of the shutter means 6 and photographic development of the film material 2, this positional relationship being made clearer if the viewfinder system includes conventionally known means delineating the area of a photograph which is subsequently produceable on the film material 2, for example.

Figure 3:
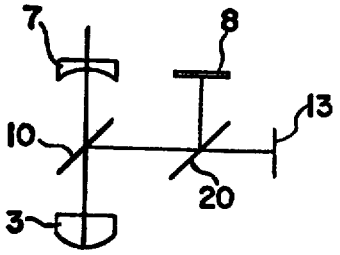
Figure 4:
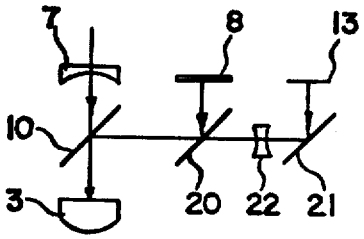
Figure 5:
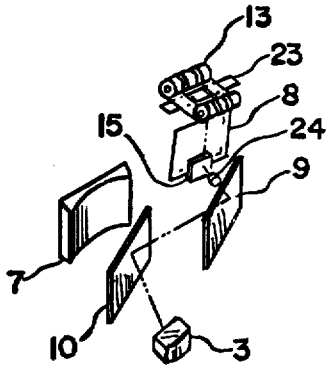

It is to be noted that the specification means 13 may be arranged at any position being apart from the eyelens 3 for the same distance as that of the frame 8 within an optical measurement. For instance, as shown in FIG. 3, the specification means 13 is placed at a position symmetrical with the frame 8 in relation to a half-mirror 20 provided in parallel to the mirror 10. Also, as shown in FIG. 4, the specification means 13 may be allocated at the side of the frame 8 in association with a concave lens 22 for compensation of light-length provided between the half-mirror 20 and reflection mirror 21, by which the data of the specification means 13 is transferred to the half-mirror 20, in such a manner that a length of light passage between the specification means 13 and half-mirror 20 is substantially equal to that of between the frame 8 and half-mirror 20. In addition, as shown in FIG. 5, the specification means 13 can be horizontally disposed above the frame 8 so as to transfer the data of the specification means 13 by means of the natural light taking from a window 23 provided on the top plane of a camera toward the eyelens 3 through the second half-mirror 15 inclined at a half of a right angle to the frame 8, a lens 24 for compensation of light length, the reflection mirror 9 and the first half-mirror 10 of viewfinder, while a light passing downwardly through the second half-mirror 15 is directed to the film material 2 in the same manner as shown in FIG. 2.

Referring mainly to FIG. 2, the gate means 14 may be of various known shutter-type construction, and is suitably constituted by a pivotally mounted element which is normally held in a position to close an opening formed in the partition wall 1' separating the exposure system compartment 1A and viewfinder system compartment 1B and is temporarily moved to open this opening, simultaneously with actuation of the shutter means 6 by an actuation lever 18 which connects to the shutter means 6. Other known constructions include for example a slide panel which actually forms part of the partition wall 1' and is moveable to an open position by independent means upon depression of the camera shutter button.

To resume, operation of the abovedescribed means is as follows. In order to obtain a photograph accompanied by data, the light source 12 is actuated, whereupon content of the specification means 13 is directed through the frame 8 and then via the mirrors 15,9 and 10 to the eyelens 3, thus permitting a photographer to verify that the correct item is specified by the specification means 13 and to check the position of the data content relative to a subsequently produced photograph of an object also viewable through the eyelens 3. Next, presuming data content and data content position are correct, the shutter means 6 is actuated, whereupon light from the object to be photographed is directed through the lens system 7 onto the film material 2, simultaneously with which action the gate means 14 is opened and light carrying the image of the content of the specification means 13 is directed via the mirror 15, lens 17 and mirror 16 onto an upper portion of the film material 2. Thus, latent images of the data content and of the object to be photographed are produced on the film material 2, which, needless to say, may be constituted as a single frame of a roll film, or as an independent film unit such as employed in auto-process cameras for production of photographs by diffusion-transfer process. If it is required to produce a photograph which is unaccompanied by data, or if it is found that the data content is incorrectly positioned, the photographer simply leaves the light source 12 unactuated and takes a photograph in the normal manner.

As clear from the above description, the present invention provides a data-recording camera which has an extremely simple construction, permits easy verification of content and position of data to be recorded, and, in one end of the same camera, allows selective production of photographs accompanied or unaccompanied by data. In this camera, presuming the light source 12 is unactuated, light entering the viewfinder system compartment 1B and reaching the mirror 16 upon opening of the gate means 14 is of course directed onto an upper, frame portion of the film material 2, although no, or only a very small amount of such light should normally reach the mirror 16, since this light is directed mainly along the optical axis of the viewfinder lens 7 which is displaced relative to the gate means 14 and any portion of this light which impinges on the mirror 15 impinges thereon from an angle which is such that there is only minimum downward reflection thereof by the mirror 15. In some cameras, however, for example in very small cameras, it may be considered desirable to eliminate all possibility of such light reaching the film material 2 when data is not recorded. This is easily achieved by provision of a means for opening of the gate means 14 whose actuation is dependent on simultaneous actuation of the shutter means 6 and of the light source 12. Needless to say, these and other modifications which do not depart from the principles of the invention are possible, For example, the gate means 14 can be eliminated by means of substituting the mirror 15 which constitutes of full-reflection type and being provided with a driving means, by which the mirror 15 is replaced from the outside of the light passage in a normal position to the other position projecting into the light passage for photographing. The scope of the invention should therefore be determined by the attached claims.

What is claimed is:

1. In a camera comprising a film exposure system which includes an object lens system for focussing of image-wise light onto photosensitive film material provide in said camera and shutter means selectively movable to positions to permit or to prevent passage of said image-wise light onto said film material, a viewfinder system which is provided independently of said film exposure system and includes an eyelens permitting viewing of an object from which image-wise light may be directed by said object lens system onto said film material, and camera wall portions defining a film exposure system compartment and a viewfinder system compartment, the improvement comprising:

externally adjustable data specification means to selectively present different items of data, first optical means for directing said image-wise light carrying said data content [to said eyelens, whereby said data content is viewable] *for viewing* in said viewfinder system *on said eyelens,* second optical means for directing said image-wise light carrying said data content onto a portion of said film material, whereby said data content may be recorded on said film material, and gate means operatively coupled to said shutter system and movable to closed position and open position *in relation with the movement of said shutter system,* said gate means being closed to prevent passage by said second optical means of said image-wise light *carrying said data content* onto said film material when said shutter means is closed *at the closed position,* and being opened to permit passage *by said second optical means* or *said* image-wise light *carrying said data content* onto said film material by said second optical means when said shutter means is opened *at the open position,* whereby content of said data specification means may be selectively recorded on said film material.

2. In a camera comprising a film exposure system which includes an object lens system for focussing of image-wise light onto photosensitive film material provided in said camera and shutter means selectively movable to positions to permit or to prevent passage of said image-wise light onto said film material, a viewfinder system which is provided independently of said film exposure system and includes an eyelens permitting viewing of an object from which image-wise light may be directed by said object lens system onto said film material, and camera wall portions defining a film exposure system compartment of a viewfinder system compartment, and partition means separating said compartment, the improvement comprising:

externally adjustable data specification means to selectively present different items of data, externally actuable normally unactuated illumination means to illuminate said data specification means, frame means defining openings permitting passage of image-wise light carrying content of said data specification means upon illumination of said data specification means by said illumination means and restricting passage of other light emitted by said illumination means, first optical means for directing said image-wise light carrying said data content to said eyelens, whereby said data content is viewable in said viewfinder system, second optical means for directing said image-wise light carrying said data content onto a portion of said film material, whereby said data content may be recorded on said film material, and gate means movably mounted in said partition means and operatively coupled to said shutter system for movement to closed and open positions, said gate means being closed and preventing passage by said second optical means of said image-wise light onto said film material when said shutter means is closed, and being opened and permitting passage of image-wise light by said second optical means when said shutter means is opened, whereby content of said data specification means may be selectively recorded on said film material.

3. Data recording camera as recited in claim 2, wherein said first optical means comprises a first full-reflection mirror positioned to receive image-wise light carrying content of said data specification means, and a first half-reflection mirror which is positioned on the optical axis of said viewfinder system and is disposed to receive image-wise light reflected by said first full-reflection mirror and to direct said image-wise light to said eyelens, and wherein said second optical means includes a second half-reflection mirror positioned between said data specification means and said first full-reflection mirror and a second full-reflection mirror which is disposed to receive imagewise light reflected by said second half-reflection mirror and direct said image-wise light onto said film material.

* * * * *